US 9,556,933 B2

(12) United States Patent
Fujimoto

(10) Patent No.: US 9,556,933 B2
(45) Date of Patent: Jan. 31, 2017

(54) ECCENTRIC OSCILLATION GEAR DEVICE

(71) Applicant: NABTESCO CORPORATION, Tokyo (JP)

(72) Inventor: Kenichi Fujimoto, Mie (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/408,471

(22) PCT Filed: Jun. 14, 2013

(86) PCT No.: PCT/JP2013/003749
§ 371 (c)(1),
(2) Date: Dec. 16, 2014

(87) PCT Pub. No.: WO2014/002419
PCT Pub. Date: Jan. 3, 2014

(65) Prior Publication Data
US 2015/0176680 A1 Jun. 25, 2015

(30) Foreign Application Priority Data

Jun. 25, 2012 (JP) .................................. 2012-141712

(51) Int. Cl.
*F16H 1/32* (2006.01)
*G07C 3/00* (2006.01)

(52) U.S. Cl.
CPC *F16H 1/32* (2013.01); *G07C 3/00* (2013.01); *F16H 2001/323* (2013.01)

(58) Field of Classification Search
CPC .............................................. F16H 2001/323
See application file for complete search history.

(56) References Cited

U.S. PATENT DOCUMENTS 6,492,787 B1 * 12/2002 Hibino ............... F16H 1/32
310/83
9,206,850 B2 * 12/2015 Takahashi ............ B60K 7/0007
(Continued)

FOREIGN PATENT DOCUMENTS

CN     101429989 A    5/2009
CN     102483132 A    5/2012
(Continued)

OTHER PUBLICATIONS

International Search Report issued in International Patent Application No. PCT/JP2013/003749, dated Jul. 30, 2013.
(Continued)

*Primary Examiner* — Tisha Lewis
(74) *Attorney, Agent, or Firm* — Pillsbury Winthrop Shaw Pittman LLP

(57) ABSTRACT

Provided is an eccentric oscillation gear device including: a crank shaft having eccentric portions; oscillation gears having insertion holes into which the eccentric portions are inserted; an outer cylinder; and a carrier. The outer cylinder and the carrier concentrically rotate relative to each other by the oscillation of the oscillation gears due to the rotation of the crank shaft. The eccentric oscillation gear device includes a storage unit which stores at least one type of information out of: information on a parameter that originates from a processing error and influences rotation angle characteristics; information on a parameter that changes depending on temperature and influences rotation angle characteristics; and information on a parameter that influences time-dependent change characteristics and influences rotation angle characteristics.

4 Claims, 5 Drawing Sheets

(56) References Cited

U.S. PATENT DOCUMENTS

2009/0124446 A1 5/2009 Miyoshi
2012/0108381 A1 5/2012 Nakamura

FOREIGN PATENT DOCUMENTS

| EP | 2 479 456 A1 | 7/2012 | |
|----|---|---|---|
| JP | 08184349 A * | 7/1996 | ............... F16H 1/32 |
| JP | 09-311725 A | 12/1997 | |
| JP | 2001-099245 A | 4/2001 | |
| JP | 2002-049900 A | 2/2002 | |
| JP | 2010-286098 A | 12/2010 | |

OTHER PUBLICATIONS

Office Action is issued in Chinese Patent Application No. 201380033994.0, dated May 31, 2016.

* cited by examiner

| OUTPUT SHAFT ROTATION ANGLE [deg] | OUTPUT SHAFT ROTATION FLUCTUATION LOAD TORQUE = 0.03 To | OUTPUT SHAFT ROTATION FLUCTUATION LOAD TORQUE = 0.5 To | OUTPUT SHAFT ROTATION FLUCTUATION LOAD TORQUE = To |
|---|---|---|---|
| 0 | 0.52 | 0.62 | 1.25 |
| 1 | 0.33 | 0.73 | 1.22 |
| 2 | 0.45 | 0.65 | 1.08 |
| 3 | 0.53 | 0.55 | 1.11 |
| . | . | . | . |
| . | . | . | . |
| 60 | 0.61 | 0.58 | 1.35 |
| . | . | . | . |
| . | . | . | . |
| 360 | 0.35 | 0.65 | 1.28 |

ECCENTRIC OSCILLATION GEAR DEVICE

CROSS-REFERENCE TO RELATED APPLICATIONS

This application is the U.S. National Stage of PCT/JP2013/003749, filed Jun. 14, 2013, which in turn claims priority to Japanese Patent Application No. 2012-141712, filed Jun. 25, 2012. The contents of all of these applications are incorporated herein by reference in their entirety.

TECHNICAL FIELD

The present invention relates to an eccentric oscillation gear device.

BACKGROUND ART

As disclosed in the following Patent Literature 1, an eccentric oscillation gear device that reduces the rotational frequency between two mating members at a predetermined reduction ratio is conventionally known. This eccentric oscillation gear device includes an outer cylinder which is fixed to one mating member, and a carrier which is fixed to the other mating member. The carrier rotates relative to the outer cylinder by the oscillating rotation of an oscillation gear mounted on an eccentric portion of a crank shaft. In the eccentric oscillation gear device, a rotational phase difference is generated in the torsional rigidity of a gear device, due to the eccentric direction of the assembled crank shaft (eccentric direction of the eccentric portion). This changes the phase of the torsional rigidity at reassembly, such as during maintenance. Therefore according to the invention disclosed in Patent Literature 1, a rotational phase adjusting unit, to determine the direction of the crank shaft, is disposed. Thereby even during reassembly after disassembly, the phase of the torsional rigidity becomes the same as the original state before disassembly.

CITATION LIST

Patent Literature

Patent Literature 1: Japanese Unexamined Patent Publication No. 2010-286098

The invention disclosed in Patent Literature 1 focuses on the rotation phase difference of the torsional rigidity due to the eccentric direction of the crank shaft (eccentric direction of the eccentric portion). However it is not only the torsional rigidity, due to the eccentric direction of the crank shaft, that influences the rotation angle characteristics of the gear device. This means that the rotation angle characteristics are expected to be improved if other factors that could influence the rotation angle characteristics, such as the positioning characteristic at stopping, are also considered.

SUMMARY OF INVENTION

It is an object of the present invention to effectively use information on the factors that could influence the rotational characteristics of a gear device.

An eccentric oscillation gear device according to an aspect of the present invention is a gear device that converts rotation frequency values between a first member and a second member at a predetermined frequency ratio, and transfers a drive force having: a crank shaft that includes an eccentric portion and rotates by drive force received from an input portion; an oscillation gear that includes an insertion hole, into which the eccentric portion is inserted, and teeth; a first cylinder that can be mounted on one of the first member and the second member; and a second cylinder that can be mounted on the other of the first member and the second member. One of the first cylinder and the second cylinder rotatably supports the crank shaft. The other of the first cylinder and the second cylinder has teeth that engage with the teeth of the oscillation gear. The first cylinder and the second cylinder can concentrically rotate relative to each other by the oscillation of the oscillation gear due to the rotation of the crank shaft. The eccentric oscillation gear device includes a storage which stores at least one type of information out of: information on a parameter that originates from a processing error and influences rotation angle characteristics; information on a parameter that changes depending on temperature and influences rotation angle characteristics; and information on a parameter that influences time-dependent change characteristics and influences rotation angle characteristics.

DESCRIPTION OF EMBODIMENTS

Figure 1:
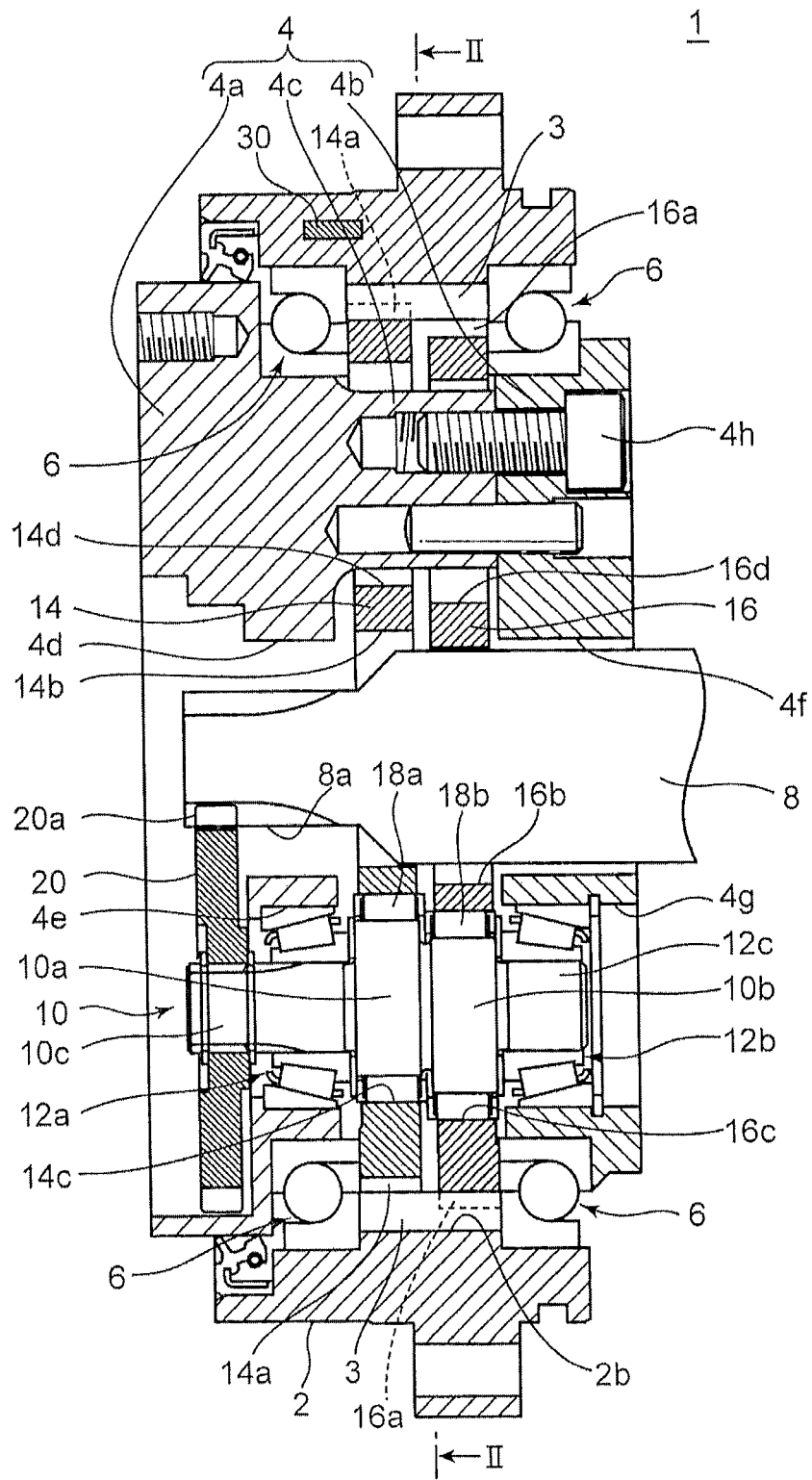
FIG. 1 is a cross-sectional view depicting the configuration of an eccentric oscillation gear device according to an embodiment of the present invention.

An eccentric oscillation gear device according to an embodiment of the present invention will now be described with reference to the drawings. The eccentric oscillation gear device (hereafter called "gear device") 1 of this embodiment is applied to a speed reducer of a rotating portion, such as a rotating body and a wrist joint of a robot and rotating portions of various machine tools, for example.

The gear device 1 according to this embodiment is configured such that the output rotation of which speed is slower than the input rotation is acquired by rotating a crank shaft 10 by rotating input shaft 8 and oscillating the oscillation gears 14 and 16 interlocking with eccentric portions 10a and 10b of the crank shaft 10.

Figure 2:
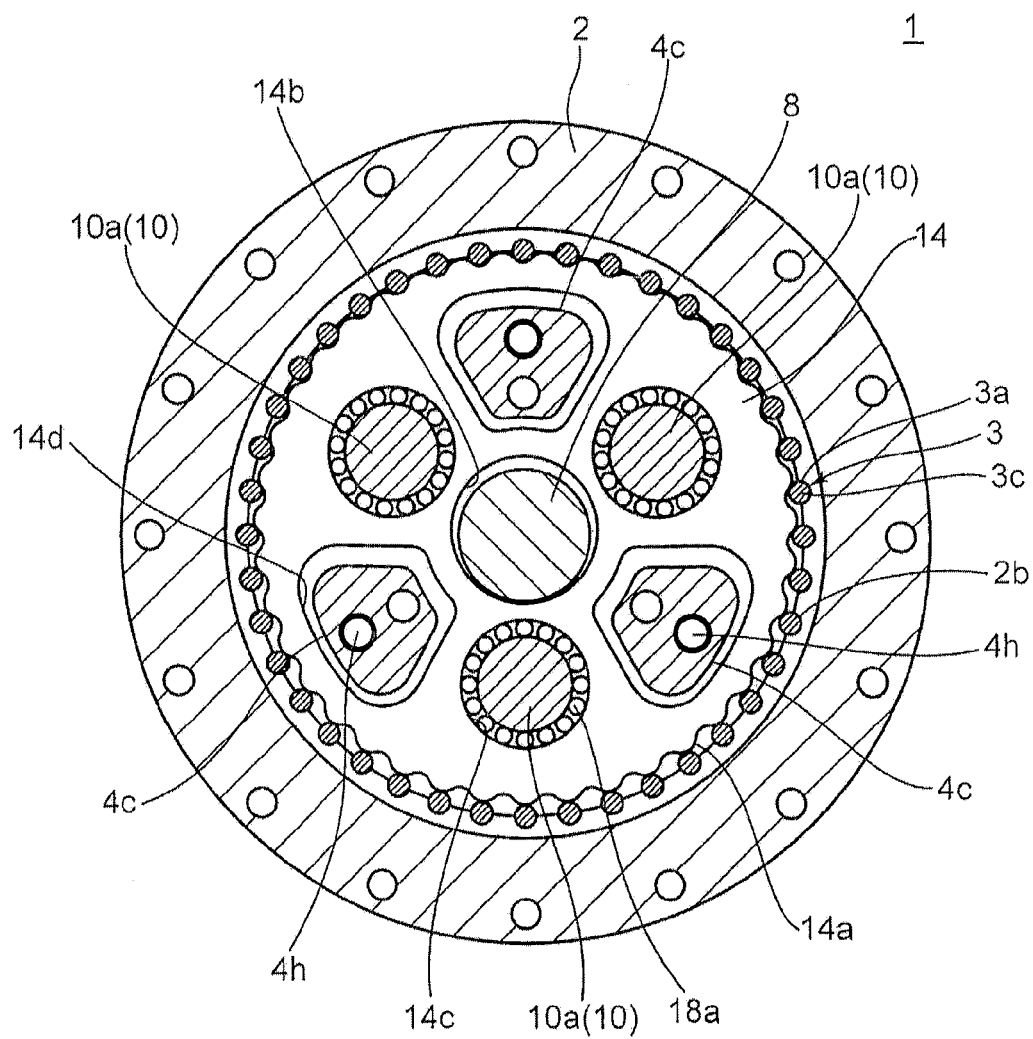
FIG. 2 is a cross-sectional view at the II-II line in FIG. 1.

As shown in FIG. 1 and FIG. 2, the gear device 1 includes an outer cylinder 2, many internal teeth pins 3, a carrier 4, an input shaft 8, a plurality (e.g. 3) of crank shafts 10, a first oscillation gear 14, a second oscillation gear 16 and a plurality (e.g. 3) of transmission gears 20.

The outer cylinder 2 constitutes an outer surface of the gear device 1, and has a substantially cylindrical shape. Many pin grooves 2b are formed on the inner circumference surface of the outer cylinder 2. Each pin groove 2b extends in an axial direction of the outer cylinder 2, and has a semicircular cross-sectional shape when sectioned orthogonally in the axial direction. The pin grooves 2b are arranged on the inner circumferential surface of the outer cylinder 2 at even intervals in the circumferential direction.

Each of the internal teeth pin 3 is disposed in the pin grove 2b respectively. Specifically, each of the internal teeth pins 3 is placed in the pin groove 2b respectively, and extends in the axial direction of the outer cylinder 2. Thereby the many internal teeth pins 3 are arranged at even intervals in the circumferential direction of the outer cylinder 2. The external teeth 14a of the first oscillation gear 14 and the external teeth 16a of the second oscillation gear 16 engage with the internal teeth pins 3.

The carrier 4 is housed inside the outer cylinder 2 in a state of being disposed coaxially with the outer cylinder 2. The carrier 4 is supported by a pair of main bearings 6 which are disposed separately from each other in the axial direction, so as to be rotatable relative to the outer cylinder 2. Therefore the carrier 4 rotates relative to the outer cylinder 2 around the same axis.

The carrier 4 has a base which includes a base plate 4a and a plurality (e.g. 3) of shafts 4c, and an end plate 4b.

The base plate 4a is disposed near one end inside the outer cylinder 2 in the axial direction. A circular through hole 4d is disposed at the center of the base plate 4a in the radial direction. A plurality (e.g. 3) of crank shaft mounting holes 4e (hereafter simply called "mounting holes 4e") is disposed around the through hole 4d at even intervals in the circumferential direction.

The end plate 4b is disposed separately from the base plate 4a in the axial direction, and is disposed near the other end inside the outer cylinder 2 in the axial direction. A through hole 4f is disposed at the center of the end plate 4b in the radial direction. A plurality (e.g. 3) of crank shaft mounting holes 4g (hereafter called "mounting holes 4g") is disposed around the through hole 4f in positions corresponding to the plurality of mounting holes 4e of the base plate 4a. A closed space is created in the outer cylinder 2 by the inner surfaces of the end plate 4b and the base plate 4a that face each other, and by the inner circumferential surface of the outer cylinder 2.

The plurality of shafts 4c is integrated with the base plate 4a, and linearly extends from the principal surface (inside surface) of the base plate 4a toward the end plate 4b. The plurality of shafts 4c is disposed at even intervals in the circumferential direction (see FIG. 2). Each shaft 4c is connected with the end plate 4b by a bolt 4h (see FIG. 1). Thereby the base plate 4a, the shafts 4c and the end plate 4b are integrated.

The input shaft 8 functions as an input portion where the drive force of a drive motor (not illustrated) is inputted. The input shaft 8 is inserted into the through hole 4f of the end plate 4b and into the through hole 4d of the base plate 4a. The input shaft 8 is disposed such that the shaft center thereof matches with the axis center of the outer cylinder 2 and the carrier 4, and rotates around the axis. An input gear 8a is formed on an outer circumferential surface at the end of the input shaft 8.

The plurality of crank shafts 10 is disposed around the input shaft 8 inside the outer cylinder 2 at even intervals (see FIG. 2). Each crank shaft 10 is supported by the carrier 14 via a pair of crank bearings 12a and 12b so as to be rotatable around the axis with respect to the carrier 4 (see FIG. 1). Specifically, the first crank bearing 12a is fitted on a portion of each crank shaft 10 that is inside from one end of the crank shaft 10 in the shaft direction by a predetermined length, and this first crank bearing 12a is mounted in a mounting hole 4e of the base plate 4a. On the other hand, the second crank bearing 12b is fitted on the other end of each crank shaft 10 in the shaft direction, and this second crank bearing 12b is mounted in a mounting hole 4g of the end plate 4b. Thereby the crank shaft 10 is rotatably supported by the base plate 4a and the end plate 4b.

Each crank shaft 10 includes a shaft body 12c and eccentric portions 10a and 10b, which are integrated with the shaft body 12c. The first eccentric portion 10a and the second eccentric portion 10b are disposed side by side in the shaft direction, between the portions supported by the crank bearings 12a and 12b. Each of the first eccentric portion 10a and the second eccentric portion 10b is in the form of cylinder, and extends out from the shaft body 12c in the radial direction in a decentered state with respect to the shaft center of the shaft body 12c. The first eccentric portion 10a and the second eccentric portion 10b are respectively decentered from the shaft center by a predetermined eccentricity, and are disposed so as to have a predetermined phase difference from each other.

A fitted portion 10c where the transmission gear 20 is mounted on is formed on one end of the crank shaft 10, that is, in a portion outside (in the shaft direction) the portion that is mounted in the mounting hole 4e of the base plate 4a.

The first oscillation gear 14 is disposed in the closed space inside the outer cylinder 2, and is fitted on the first eccentric portion 10a of each crank shaft 10 via a first roller bearing 18a. When each crank shaft 10 rotates and the first eccentric portion 10a eccentrically rotates, the first oscillation gear 14 performs oscillating rotation with interlocking with this eccentric rotation, while engaged with the internal teeth pins 3.

The size of the first oscillation gear 14 is slightly smaller than the inner diameter of the outer cylinder 2. The first oscillation gear 14 includes first external teeth 14a, a center through hole 14b, a plurality (e.g. 3) of first eccentric portion insertion holes 14c, and a plurality (e.g. 3) of shaft insertion holes 14d.

The center through hole 14b is disposed at the center of the first oscillation gear 14 in the radial direction. The input shaft 8 is inserted into the center through hole 14b with some clearance.

The plurality of first eccentric portion insertion holes 14c is disposed around the center through hole 14b of the first oscillation gear 14 at even intervals in the circumferential direction. The first eccentric portion 10a of each crank shaft 10 is inserted into each first eccentric portion insertion hole 14c respectively via the first roller bearing 18a.

The plurality of shaft insertion holes 14d is disposed around the center through hole 14b of the first oscillation gear 14 at even intervals in the circumferential direction. Each shaft insertion hole 14d is disposed respectively in a position between the adjacent first eccentric portion insertion holes 14c in the circumferential direction. Each of the shaft 4c is inserted into the corresponding shaft insertion hole 14d with some clearance.

The second oscillation gear 16 is disposed in the closed space inside the outer cylinder 2, and is fitted on the second eccentric portion 10b of each crank shaft 10 via a second roller bearing 18b. The first oscillation gear 14 and the second oscillation gear 16 are disposed side by side in the axial direction, corresponding to the positions of the first eccentric portion 10a and the second eccentric portion 10b. When each crank shaft 10 rotates and the second eccentric portion 10b eccentrically rotates, the second oscillation gear 16 performs oscillating rotation with interlocking this eccentric rotation while engaged with the internal teeth pins 3.

The size of the second oscillation gear 16 is slightly smaller than the inner diameter of the outer cylinder 2, and the configuration thereof is the same as the first oscillation gear 14. In other words, the second oscillation gear 16 includes second external teeth 16a, a center through hole 16b, a plurality (e.g. 3) of second eccentric portion insertion holes 16c, and a plurality (e.g. 3) of shaft insertion holes 16d. These elements have a same configuration as those of the first external teeth 14a, the center through hole 14b, the plurality of first eccentric portion insertion holes 14c and the plurality of shaft insertion holes 14d of the first oscillation gear 14. The second eccentric portion 10b of the crank shaft 10 is inserted into second eccentric portion insertion hole 16c via the second roller bearing 18b.

Each transmission gear 20 transfers the rotation of the input gear 8a to a corresponding crank shaft 10. Each transmission gear 20 is externally fitted on the fitted portion 10c disposed on one end of the shaft body 12c of the corresponding crank shaft 10. Each transmission gear 20 coaxially rotates together with the crank shaft 10. Each transmission gear 20 includes external teeth 20a which engage with the input gear 8a.

The gear device 1 comprises a storage unit 30 which stores information on parameters that influence the rotation angle characteristics. This storage unit 30 is constituted by an IC chip which includes a communication control section and a storage control section, and is embedded in the outer cylinder 2, for example. The information stored in the storage unit 30 can be read by an external non-contact scanner.

The information stored in the storage unit 30 includes at least one type of information out of: information on a parameter that originates from rotation rigidity characteristics of the internal components of the speed reducer and a processing error, and influences the rotation angle characteristics (processing error and rigidity information); information on a parameter that changes depending on the temperature, and influences the rotation angle characteristics (temperature change error information); and information on a parameter that influences time-dependent change characteristics, and influences the rotation angle characteristics (time-dependent change error information). The rotation angle characteristics are characteristics expressed when the output shaft (e.g. carrier 4 or outer cylinder 2) rotates, and are characteristics on the difference of the actual rotation angle from the theoretical rotation angle, and which primarily influence a stop position error, positioning error or the like.

If the processing error and rigidity information are included, then information on the output shaft rotation fluctuation, for example, is stored as error information. The information on the output shaft rotation fluctuation indicates, expressed in association with the output shaft rotation angle, a rotation angle that is expressed as a ratio with respect to a theoretical rotation angle and that is actually generated in the output shaft (e.g. carrier 4 or outer cylinder 2) affected by the torsion rigidity characteristics of the internal components of the speed reducer and processing error when torque is applied to the output shaft in a state where the input shaft 8 is fixed. The rotation angle actually generated in the output shaft is slightly different from the theoretical rotation angle due to the torsion rigidity characteristics and the processing accuracy of the components. Therefore if the information on the rotation fluctuation of the output shaft, acquired from the result of measuring the actual rotation angle generated when the load torque is inputted, is used for controlling the stopping of the gear device 1, then the stopping errors of a robot or the like, where the gear device 1 is mounted in, can be reduced.

Figures 3, 4:
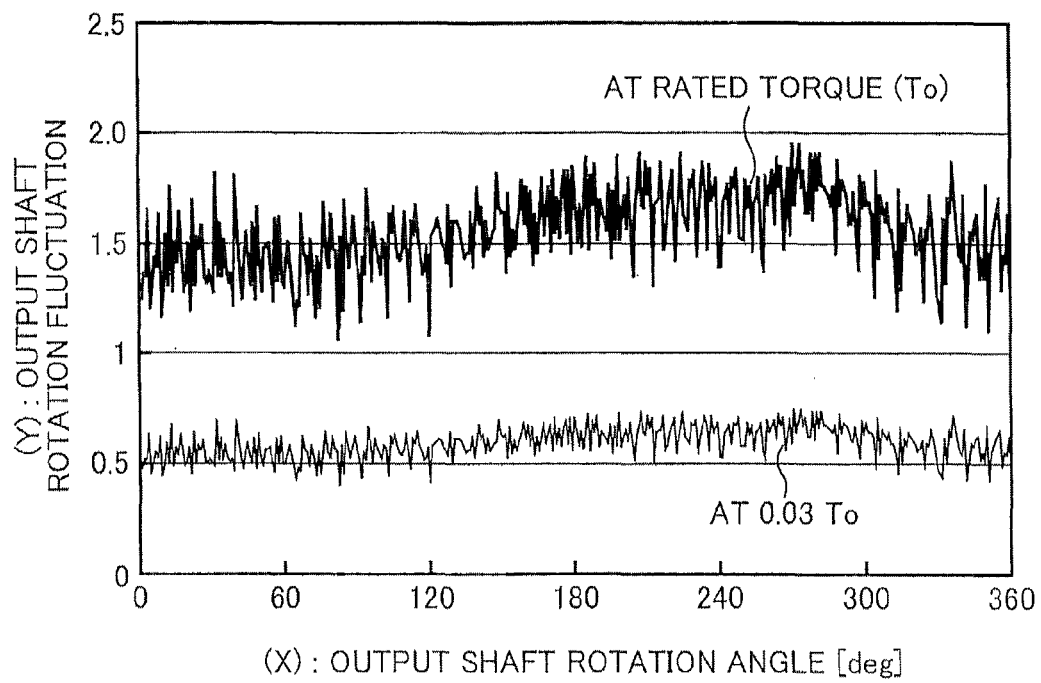
FIG. 3 shows an example of a map associating the output shaft rotation fluctuation with the output shaft rotation angle.
FIG. 4 shows an example of a waveform of the output shaft rotation fluctuation.

As FIG. 3 shows, for example, the storage unit 30 stores a map associating the output shaft rotation fluctuation (ratio of the output rotation angle (measured value) of the output shaft with respect to the theoretical rotation angle) with the rotation angle of the output shaft. In this embodiment, an output shaft rotation fluctuation is stored for each degree of the output shaft rotation angle.

The value of the output shaft rotation fluctuation is acquired by a test which is normally performed before shipping the gear device 1. Therefore no special additional data acquisition is required to store this data in the storage unit 30.

In addition to the output shaft rotation fluctuation when the load torque is the rated torque To, the storage unit 30 also stores the output shaft rotation fluctuation when the load torque is ½ (0.5 To) of the rated torque To, and when the load torque is 3% (0.03 To) of the rated torque To, in association with the output shaft rotation angle. This can meet user demand when using a load torque of ½ To or 0.03 To is more practical than using the rated torque To. Storing the output shaft rotation fluctuation in the case of ½ To and the output shaft rotation fluctuation in the case of 0.03 To may be omitted.

Using the information stored in the storage unit 30, the angle of a robot arm can be corrected, for example, according to the following procedure.

First the output shaft (e.g. carrier 4 or the outer cylinder 2) is rotated in a state where the input shaft 8 is fixed. At this time, the load torque is calculated based on the motor current value or the like, and the input torque is adjusted to the rated torque. Then the rotation angle of the output shaft is measured by the motor encoder (not illustrated). Information on the output shaft rotation fluctuation corresponding to this rotation angle is read from the storage unit 30, and this information is fed back to the robot controller. The fed back information becomes the correction information, and the robot controller corrects the angle according to this correction information, whereby the angle of the robot arm is corrected.

In this embodiment, a map, in which the output shaft rotation fluctuation and the output shift rotation angle are associated, is stored, but the embodiment is not limited to this. For example, if a waveform indicting the relationship between the output shaft rotation fluctuation (ratio of the output shaft rotation angle (measured value) with respect to the theoretical rotation angle) and the output shaft rotation angle is acquired in advance, as shown in FIG. 4, this waveform may be expressed as a function, and the function may be stored in the storage unit 30. This function expresses the relationship between the output shaft rotation angle (X) and the output shaft rotation fluctuation (Y) as $Y=f(X)$. $Y=f(T \cdot X)$, which also takes the load torque (T) into consideration, may be used instead.

In this embodiment, the data on the output shaft rotation fluctuation is the data acquired by directly measuring the output shaft rotation fluctuation, but the embodiment is not limited to this. For example, data that indirectly influences the output shaft rotation angle, such as hysteresis characteristics (backlash, lost-motion, spring constant) may be measured, and this measured data may be stored as information on the output shaft rotation fluctuation. The user may use this information for controlling the output rotation angle.

Figure 5:
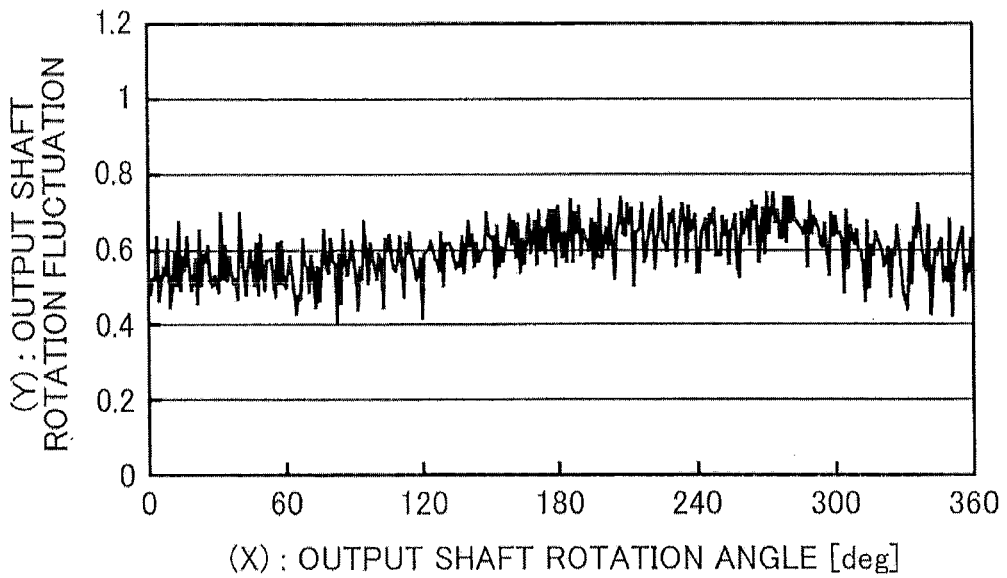
FIG. 5 shows an example of the change amount of the output shaft rotation fluctuation with respect to a plurality of case temperatures.
Figure 5:
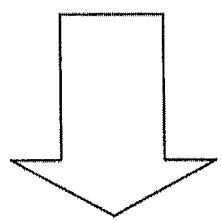
Figure 5:
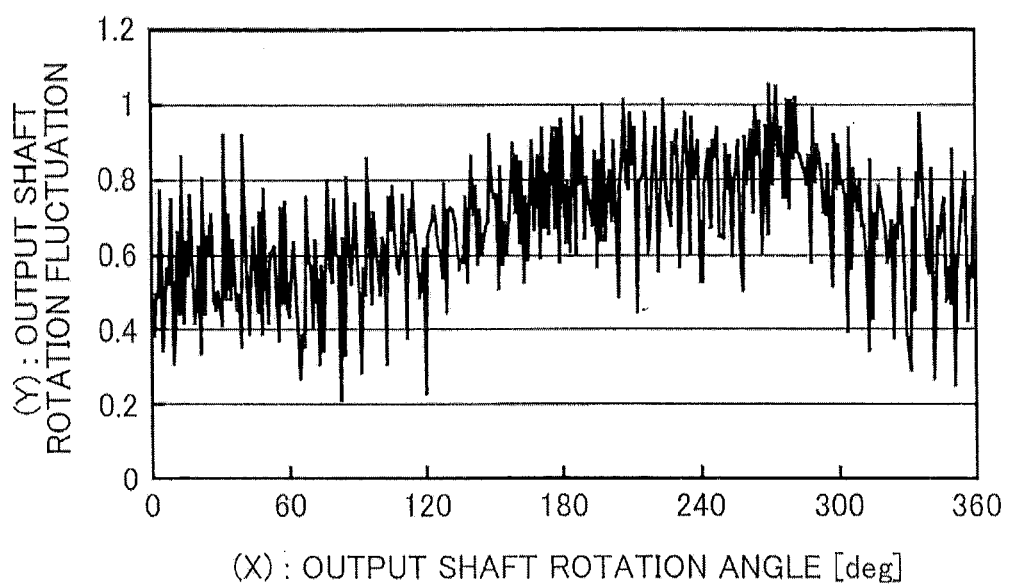

If the temperature change error information is included, the temperature change error information may be information on the linear expansion coefficients of the oscillation gears 14 and 16, for example, or may be information associating the temperature of the outer cylinder 2 (case temperature) with the difference of the actual rotation angle from the theoretical rotation angle. For example, as shown in FIG. 5, the output shaft rotation fluctuation at a plurality of case temperature values (ratio of the actually generated output shaft rotation angle with respect to the theoretical rotation angle) is determined in advance (data at two temperature values are shown in FIG. 5, but data at more temperature values may be determined), and information that indicates the change of the output shaft rotation fluctuation depending on the change of the case temperature, acquired from this data, may be stored in the storage unit 30. In the case of storing this kind of information in the storage unit 30 as well, the change of the output shaft rotation characteristics can be utilized, for example, for controlling the angle correction of a robot.

Figure 6:
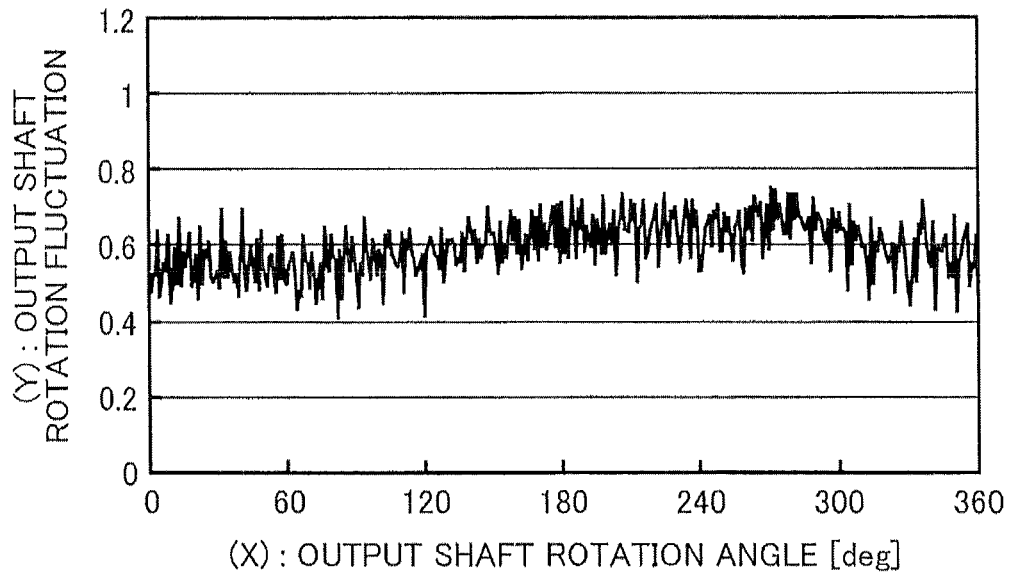
FIG. 6 shows an example of the change amount of the output shaft rotation fluctuation along with the lapse of the operation time of the eccentric oscillation gear device.
Figure 6:
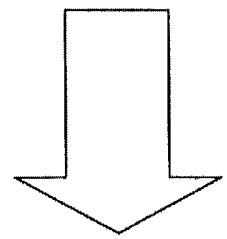
Figure 6:
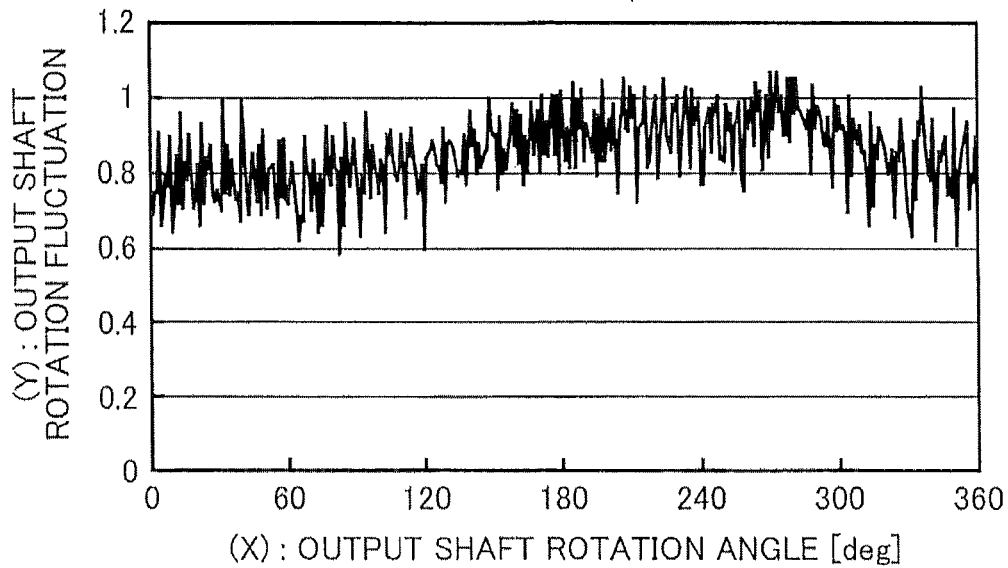

In the case of including the time-dependent change error information, information associating the operation time of the gear device 1 with the difference of the actual rotation angle from the theoretical rotation angle is stored as the time-dependent change error information. For example, as shown in FIG. 6, the change amount of the output shaft rotation fluctuation along with a lapse in the operation time of the gear device 1 is determined in advance, and information that indicates the change amount of the output shaft rotation fluctuation, along with the lapse in the operation time of the gear device 1 may be stored in the storage unit 30. In the case of storing this kind of information in the storage unit 30 as well, the change of the output shaft rotation characteristics can be utilized, for example, for controlling the angle correction of a robot.

As described above, according to the gear device 1 of this embodiment, the storage unit 30 stores at least one type of information out of: information on a parameter that originates from a processing error and influences rotation angle characteristics; information on a parameter that changes depending on the temperature and influences rotation angle characteristics; and information on a parameter that influences time-dependent change characteristics and influences rotation angle characteristics. Therefore by utilizing the information stored in the storage unit 30, the rotation angle characteristics of a robot or the like, in which the eccentric oscillation gear device 1 is incorporated, can be improved. In other words, if the information on a parameter that originates from the processing error and influences rotation angle characteristics is stored in the storage unit 30, the rotation angle correction control, in accordance with individual differences, can be performed utilizing the stored information. Therefore the rotation angle characteristics of a robot or the like can be improved by the rotation angle correction control. If the information on a parameter that changes depending on the temperature and influences rotation angle characteristics is stored in the storage unit 30, the control to cancel a rotation angle error, due to the change in ambient temperature, can be performed utilizing this stored information. Therefore the generation of a rotation angle error due to the change in ambient temperature can be suppressed. If the information on a parameter that influences the time-dependent change characteristics and influences rotation angle characteristics is stored in the storage unit 30, the control to cancel a rotation angle error due to the time-dependent change can be performed by utilizing this stored information. Therefore the generation of a rotation angle error, due to the time-dependent change of the gear device 1, can be suppressed.

In this embodiment, the information stored in the storage unit 30 can be read by an external non-contact scanner, hence the information stored in the storage unit 30 can be read in a state where the storage unit 30 is mounted in the gear device 1. This can simplify procedures to read information.

The present invention is not limited to this embodiment, and can be changed and modified in various ways within a scope that does not depart from the spirit of the invention. For example, in this embodiment, two oscillation gears 14 and 16 are disposed, but the embodiment is not limited to this. For example, one oscillation gear may be disposed, or three or more oscillation gears may be disposed.

In this embodiment, the input shaft 8 is disposed at the center of the carrier 4, and a plurality of crank shafts 10 are disposed around the input shaft 8, but the embodiment is not limited to this. For example, one crank shaft 10 may be disposed at the center of the carrier 4, that is, a so called "center crank shaft" may be used. In this case, the input shaft 8 may be disposed at any position as long as the input shaft 8 can engage with the transmission gear 20 fitted on the crank shaft 10.

In this embodiment, the storage unit 30 is embedded in the outer cylinder 2, but the embodiment is not limited to this. For example, the storage unit 30 may be mounted on the surface of the outer cylinder 2, or may be mounted in the carrier 4. The information stored in the storage unit 30 is not limited to the information that can be read by a non-contact scanner.

The embodiment will be summarized below.

(1) In the embodiment, the storage unit stores at least one type of information out of: information on a parameter that originates from a processing error and influences rotation angle characteristics; information on a parameter that changes depending on temperature and influences rotation angle characteristics; and information on a parameter that influences time-dependent change characteristics and influences rotation angle characteristics. Therefore by utilizing information stored in the storage unit, rotation angle characteristics of an apparatus in which the eccentric oscillation gear device is incorporated can be improved. In other words, if the information on a parameter that originates from a processing error and influences rotation angle characteristics is stored in the storage unit, the rotation angle correction control in accordance with individual differences of the eccentric oscillation gear device can be performed utilizing this stored information. Therefore the rotation angle characteristics of the apparatus, in which the eccentric oscillation gear device is incorporated, can be improved by the rotation angle correction control. If the information on a parameter that changes depending on temperature and influences rotation angle characteristics is stored in the storage unit, the control to cancel the rotation angle error due to a change in ambient temperature can be performed utilizing this stored information. Therefore generation of a rotation angle error due to a change in the ambient temperature can be suppressed. If the information on a parameter that influences the time-dependent change characteristics and influences rotation angle characteristics is stored in the storage unit, the control to cancel the rotation angle error due the time-dependent change characteristics can be performed by utilizing this stored information. Therefore generation of the rotation angle error due to the time-dependent change of the eccentric oscillation gear device can be suppressed.

(2) It is preferable that the information on a parameter that originates from a processing error and influences rotational angle characteristics includes at least one of; information on a rotation angle error that is generated in one of the first cylinder and the second cylinder when torque is applied to one of the first cylinder and the second cylinder in a state where the input portion is fixed; and information on a rotation angle error that is generated in one of the first cylinder and the second cylinder when the crank shaft is rotated.

According to this aspect, information on a rotation angle error that is generated in one of the first cylinder and the second cylinder is included, hence control to cancel the rotation angle error in one of the first cylinder and the second cylinder can be performed utilizing this information.

(3) The information on a parameter that changes depending on temperature and influences rotation angle characteristics may include information on a linear expansion coefficient of the oscillation gear, or information that indicates a change of rotation angle fluctuation around the shaft depending on a temperature change of the first cylinder or the second cylinder.

According to this aspect, control to cancel the rotation angle error can be performed by utilizing this information.

(4) The information on a parameter that influences the time-dependent change characteristics and influences rotation angle characteristics may include information that indicates a change of the rotation angle fluctuation around the shaft of the first cylinder or the second cylinder depending on an operation time of the eccentric oscillation gear device.

According to this aspect, control to cancel the rotation angle error can be performed by utilizing this information, even if the rotation angle fluctuation amount around the shaft changes along with a lapse in the operation time of the eccentric oscillation gear device.

(5) It is preferable that the information stored in the storage unit can be read by an external non-contact scanner.

According to this aspect, information stored in the storage unit can be read in a state where the storage unit is mounted in the eccentric oscillation gear device. This can simplify the procedure to read information.

As describe above, information on factors that could influence the rotation angle characteristics can be effectively utilized. Thereby rotation angle characteristics can be improved.

1 eccentric oscillation gear device
2 outer cylinder
3 internal teeth pins
4 carrier
6 main bearing
8 input shaft
10 crank shaft
10a first eccentric portion
10b second eccentric portion
12a first crank bearing
12b second crank bearing
12c shaft body
14 first oscillation gear
14a external teeth
14c eccentric portion insertion hole
16 second oscillation gear
16a external teeth
16c eccentric portion insertion hole
18a first roller bearing
18b second roller bearing
20 transmission gear
30 storage unit

The invention claimed is:

1. An eccentric oscillation gear device that converts rotation frequency between a first member and a second member at a predetermined rotation frequency ratio and transfers a drive force, comprising:
 a crank shaft that includes an eccentric portion and rotates by drive force received from an input portion;
 an oscillation gear that includes an insertion hole, into which the eccentric portion is inserted, and teeth;
 a cylinder configured to be mounted on one of the first member and the second member; and
 a carrier configured to be mounted on the other of the first member and the second member,
 wherein the carrier rotatably supports the crank shaft, and the cylinder has teeth that engage with the teeth of the oscillation gear,
 the cylinder and the carrier are configured to concentrically rotate relative to each other by oscillation of the oscillation gear due to rotation of the crank shaft, and
 the eccentric oscillation gear device includes a storage unit which stores at least one item of parameter information selected from the group consisting of: information on a parameter that originates from a processing error and influences rotation angle characteristics; information on a parameter that changes depending on temperature and influences rotation angle characteristics; and information on a parameter that influences time-dependent change characteristics and influences rotation angle characteristics,
 wherein the information on a parameter that originates from a processing error and influences rotational angle characteristics includes at least one of: information on a rotation angle error that is generated in one of the cylinder and the carrier when torque is applied to one of the cylinder and the carrier in a state where the input portion is fixed, the information indicating a rotation angle of the one of the cylinder and the carrier that is expressed as a ratio with respect to a theoretical rotation angle; and information on a rotation angle error that is generated in one of the cylinder and the carrier when the crank shaft is rotated, the information indicating a rotation angle of the one of the cylinder and the carrier that is expressed as a ratio with respect to a theoretical rotation angle.

2. An eccentric oscillation gear device that converts rotation frequency between a first member and a second member at a predetermined rotation frequency ratio and transfers a drive force, comprising:
 a crank shaft that includes an eccentric portion and rotates by drive force received from an input portion;
 an oscillation gear that includes an insertion hole, into which the eccentric portion is inserted, and teeth;
 a cylinder configured to be mounted on one of the first member and the second member; and
 a carrier configured to be mounted on the other of the first member and the second member,
 wherein the carrier rotatably supports the crank shaft, and the cylinder has teeth that engage with the teeth of the oscillation gear,
 wherein the cylinder and the carrier are configured to concentrically rotate relative to each other by oscillation of the oscillation gear due to rotation of the crank shaft, and
 wherein the eccentric oscillation gear device includes a storage unit which stores at least one item of parameter information selected from the group consisting of: information on a parameter that originates from a processing error and influences rotation angle characteristics; information on a parameter that changes depending on temperature and influences rotation angle characteristics; and information on a parameter that influences time-dependent change characteristics and influences rotation angle characteristics, wherein the information on a parameter that changes depending on temperature and influences rotation angle characteristics includes information on a linear expansion coefficient of the oscillation gear, or information that indicates a change of rotation angle fluctuation around the shaft in accordance with a temperature change of the cylinder or the carrier.

3. An eccentric oscillation gear device that converts rotation frequency between a first member and a second member at a predetermined rotation frequency ratio and transfers a drive force, comprising:

a crank shaft that includes an eccentric portion and rotates by drive force received from an input portion;

an oscillation gear that includes an insertion hole, into which the eccentric portion is inserted, and teeth;

a cylinder configured to be mounted on one of the first member and the second member; and a carrier configured to be mounted on the other of the first member and the second member, wherein the carrier rotatably supports the crank shaft, and the cylinder has teeth that engage with the teeth of the oscillation gear, wherein the cylinder and the carrier are configured to concentrically rotate relative to each other by oscillation of the oscillation gear due to rotation of the crank shaft, and wherein the eccentric oscillation gear device includes a storage unit which stores at least one item of parameter information selected from the group consisting of: information on a parameter that originates from a processing error and influences rotation angle characteristics; information on a parameter that changes depending on temperature and influences rotation angle characteristics; and information on a parameter that influences time-dependent change characteristics and influences rotation angle characteristics, wherein the information on a parameter that influences time-dependent change characteristics and influences rotation angle characteristics includes information that indicates a change of rotation angle fluctuation around the shaft of the cylinder or the carrier depending on an operation time of the eccentric oscillation gear device.

4. The eccentric oscillation gear device according to claim 1, wherein the information stored in the storage unit is configured to be read by an external non-contact scanner.

* * * * *